US007742109B2

(12) United States Patent
Weitbruch et al.

(10) Patent No.: US 7,742,109 B2
(45) Date of Patent: Jun. 22, 2010

(54) ADAPTIVE NOISE REDUCTION FOR DIGITAL DISPLAY PANELS

(75) Inventors: Sébastien Weitbruch, Niedereschach (DE); Rainer Zwing, VS-Villingen (DE); Carlos Correa, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1147 days.

(21) Appl. No.: 10/525,182

(22) PCT Filed: Aug. 5, 2003

(86) PCT No.: PCT/EP03/50362

§ 371 (c)(1), (2), (4) Date: Oct. 26, 2005

(87) PCT Pub. No.: WO2004/019313

PCT Pub. Date: Mar. 4, 2004

(65) Prior Publication Data

US 2006/0125718 A1 Jun. 15, 2006

(30) Foreign Application Priority Data

Aug. 23, 2002 (EP) .................................. 02292091

(51) Int. Cl.
*H04N 5/00* (2006.01)

(52) U.S. Cl. ...................................................... 348/607

(58) Field of Classification Search ................. 348/607, 348/609, 611, 614, 618, 625; 382/268, 262, 382/216, 128, 130

See application file for complete search history.

(56) References Cited

U.S. PATENT DOCUMENTS

| | | | | | |
|---|---|---|---|---|---|
| 5,512,956 | A | * | 4/1996 | Yan | 348/606 |
| 5,617,135 | A | * | 4/1997 | Noda et al. | 348/14.12 |
| 5,724,098 | A | * | 3/1998 | Murakami et al. | 348/416.1 |
| 5,835,630 | A | * | 11/1998 | Schweid et al. | 382/173 |
| 5,836,630 | A | * | 11/1998 | Putnam, Jr. | 294/50.5 |
| 5,959,693 | A | * | 9/1999 | Wu et al. | 348/624 |
| 6,340,994 | B1 | | 1/2002 | Margulis et al. | |
| 6,417,835 | B1 | | 7/2002 | Otobe et al. | |
| 7,006,255 | B2 | * | 2/2006 | Sun et al. | 358/3.27 |
| 7,054,500 | B1 | * | 5/2006 | Lillevold | 382/260 |
| 7,158,107 | B2 | * | 1/2007 | Kawabe et al. | 345/89 |
| 7,375,760 | B2 | * | 5/2008 | Kempf et al. | 348/441 |

* cited by examiner

FOREIGN PATENT DOCUMENTS

| | | |
|---|---|---|
| EP | 893916 | 1/1999 |
| EP | 1136974 | 9/2001 |

OTHER PUBLICATIONS

Search Report Dated Oct. 27, 2003.

*Primary Examiner*—Paulos M Natnael
(74) *Attorney, Agent, or Firm*—Robert D. Shedd; Robert B. Levy; Jorge Tony Villabon

(57) ABSTRACT

A plasma display panel is a pure linear display and does not provide a non-linear gamma behavior like a CRT so that an artificial gamma function has to be applied to the signal in digital form. This gamma function increases the quantization steps in the dark areas whereas the quantization steps will be reduced in the luminous areas. The basic idea is to apply an adaptive noise filtering after the gammatization process. The adaptive filtering is a specific filtering which is adapted to the gammatization quantization noise. In other words, the filtering will be maximum for dark areas and its efficacy will be automatically decreased when the luminance of the area is increasing.

10 Claims, 6 Drawing Sheets

ADAPTIVE NOISE REDUCTION FOR DIGITAL DISPLAY PANELS

Figure 1:
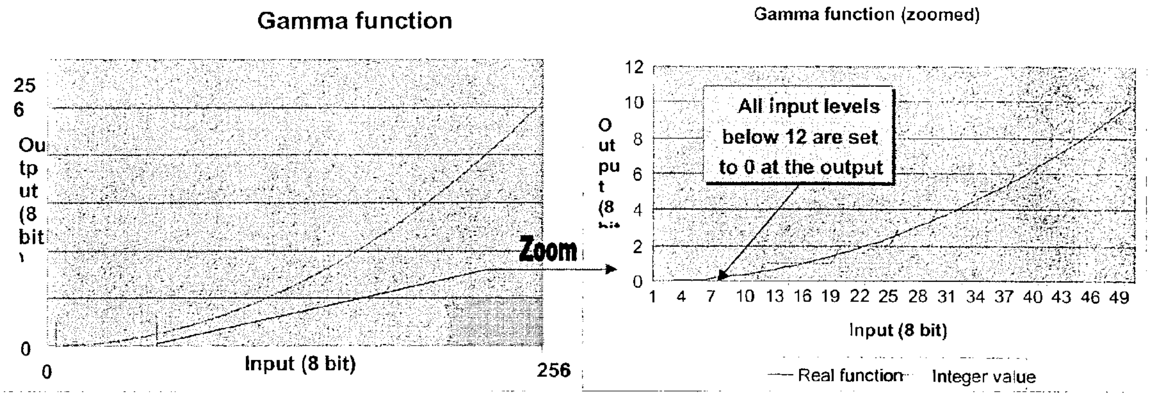
Prior Art Fig. 1

This application claims the benefit, under 35 U.S.C. §365 of International Application PCT/EP03/050362, filed Aug. 5, 2003, which was published in accordance with PCT Article 21(2) on Mar. 4, 2004 in English and which claims the benefit of European patent application No. 02292091.2, filed Aug. 23, 2002.

The present invention relates to a method and device for reducing noise caused by quantization during the signal processing of a digital display device, wherein a signal charged with noise is digitally filtered with a digital filter having a plurality of filter coefficients.

BACKGROUND

A PDP for Plasma Display Panel utilizes a matrix array of discharge cells, which can only be "ON", or "OFF". Therefore, it can be defined as a pure digital display. Also unlike a CRT (Cathode Ray Tube) or LCD (Liquid Crystal Display) in which gray levels are expressed by analog control of the light emission, a PDP controls the gray level by modulating the number of light pulses per frame (sustain pulses). This time-modulation will be integrated by the eye over a period corresponding to the eye time response. Since the amplitude video is portrayed by the number of light pulses, occurring at a given frequency, more amplitude means more light pulses and thus more "ON" time. For this reason, this kind of modulation is also known as PWM, pulse width modulation.

This PWM is responsible for one of the PDP image quality problems: the overall noise level, especially in the darker regions of the picture. This is due to the fact that displayed luminance is linear to the number of pulses, but the eye response and sensitivity to noise is not linear. In darker areas the eye is more sensitive than in brighter areas. This means that even though modern PDPs can display ca. 255 discrete video levels, quantization error will be quite noticeable in the darker areas. Moreover, all video pictures are pre-corrected to compensate the traditional gamma curves from standard display (e.g. CRT). Since, the plasma display is a pure linear display and does not provide such a non-linear gamma behavior, an artificial gamma function should be performed at the display level and in a digital form. This gamma function increases the quantization steps in the dark areas whereas the quantization steps will be reduced in luminous areas. In addition, an increasing of the quantization step will drastically increase the level of the noise present in the picture.

In the following, the quantization noise after gammatization of a video signal is described.

The method used to render video levels on a plasma (PWM) is responsible for one of the PDP image quality problems: the big quantization steps, especially in the darker regions of the picture increase strongly the noise level in those areas. This is due to the fact, that displayed luminance is linear to the number of impulses for driving the luminous elements, but the eye response and sensitivity to noise is not linear. In darker areas the eye is more sensitive than in brighter areas. This means than even though modern PDPs can display ca 255 discrete video levels, quantization error will be quite noticeable in the darker areas.

Moreover, all video pictures are pre-corrected by a $\gamma^{-1}$ function to compensate the traditional gamma curves ($\gamma$) from standard display (e.g. CRT). Since, the plasma display is a pure linear display and does not provide such a non-linear gamma behavior, an artificial gamma function should be applied to the display level and in a digital form. This degamma function increases the quantization noise in the dark areas whereas the quantization noise will be reduced in luminous areas.

A standard gamma function applied on 8-bit level using the following formula:

$$\mathrm{Out}\,(x,y) = 225\cdot\left(\frac{\mathrm{In}\,(x,y)}{255}\right)^{\gamma} \text{ with } \gamma \approx 2$$

shall be taken as example. FIG. 1 illustrates such a function. It shows that a gamma function applied to 8-bit level generates a strong quantization effect in the dark area. For instance, all input levels below 12 are set together to 0 after the gammatization, i.e. the application of the $\gamma$ function. The following table presents the detail of the computation for some video levels:

| Input (8-bit) | (Output (float) | Output (8-bit) |
|---|---|---|
| 0 | 0 | 0 |
| 1 | 0,003921569 | 0 |
| 2 | 0,015686275 | 0 |
| 3 | 0,035294118 | 0 |
| 4 | 0,062745098 | 0 |
| 5 | 0,098039216 | 0 |
| 6 | 0,141176471 | 0 |
| 7 | 0,192156863 | 0 |
| 8 | 0,250980392 | 0 |
| 9 | 0,317647059 | 0 |
| 10 | 0,392156863 | 0 |
| 11 | 0,474509804 | 0 |
| 12 | 0,564705882 | 1 |
| 13 | 0,662745098 | 1 |
| 14 | 0,768627451 | 1 |
| 15 | 0,882352941 | 1 |
| 16 | 1,003921569 | 1 |
| 17 | 1,133333333 | 1 |
| 18 | 1,270588235 | 1 |
| 19 | 1,415686275 | 1 |
| 20 | 1,568627451 | 2 |
| 21 | 1,729411765 | 2 |
| 22 | 1,898039216 | 2 |
| 23 | 2,074509804 | 2 |
| ... | ... | ... |
| 250 | 245,0980392 | 245 |
| 251 | 247,0627451 | 247 |
| 252 | 249,0352941 | 249 |
| 253 | 251,0156863 | 251 |
| 254 | 253,0039216 | 253 |
| 255 | 255 | 255 |

This table shows that, in the dark areas, there are less output values than input values which means that the quantization steps have increased. On the opposite, in high levels, there are less input than output values (e.g. no input to generate the value 246) which means that the quantization noise has been reduced.

Standard digital pictures suffer from quantization noise which depends on the number of bits used for the digitalization. In addition to that, all natural sequences contain some natural noise (mainly gaussian noise). The overall visibility of these noise effects also depends on its temporal variation which generates a kind of bustling effect.

Figure 2:
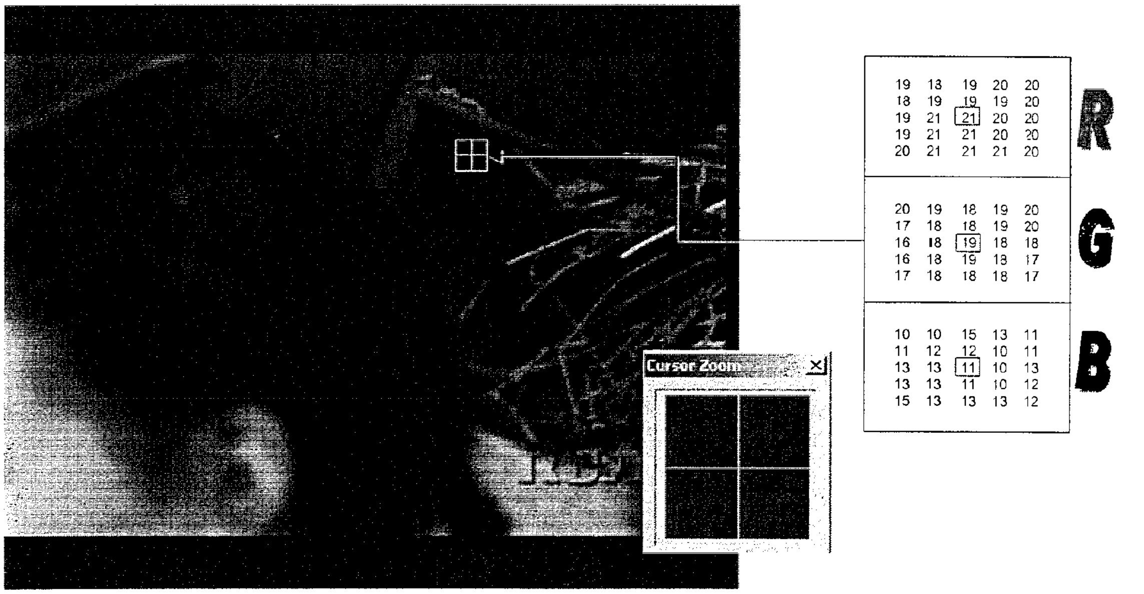
Prior Art Fig. 2

FIG. 2 presents the video values of a standard digital video picture before gammatization. It shows an example of quantization noise and natural noise for the three color-components R,G,B of a part of the picture. This noise is enhanced by its temporal variation.

Now, there shall be given an estimation of the effect obtained on a CRT disposing of an analog gammatization function (tube behavior). For that estimation, the assumption is taken that the luminance of the white will be 100 cd/m$^2$ and that the CRT behavior can be represented by:

$$CRT\ (x, y) = 100 \cdot \left(\frac{\text{In}\ (x, y)}{255}\right)^{\gamma} \text{ with } \gamma = 2.$$

Figure 3:
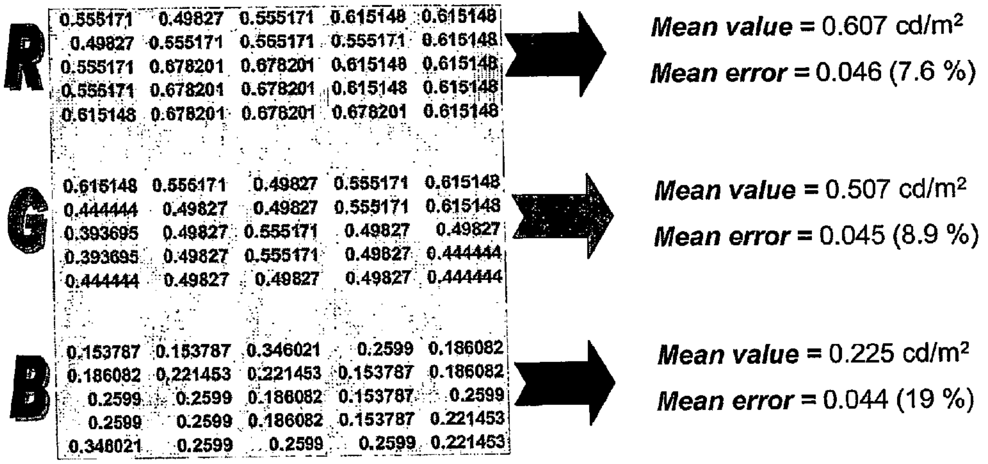

In that case, the noise pattern on the CRT will be transformed as shown in FIG. 3. From the luminance values of the three patterns R,G,B, is calculated for each component R,G,B a mean noise value and a mean error value on a CRT screen.

Figure 4:
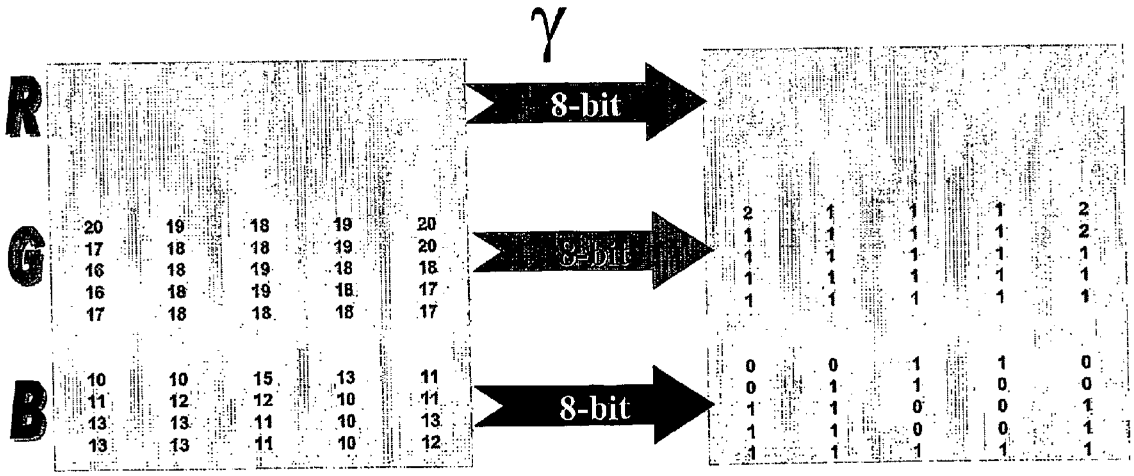

This shall be compared with the noise generated in the case of a plasma display. First, the gammatization will be performed at digital level (8-bit) as shown in FIG. 4. The degammatization is performed on the input values as those given in FIG. 2 for the three components R,G,B. At the output a digital value is obtained.

Figure 5:
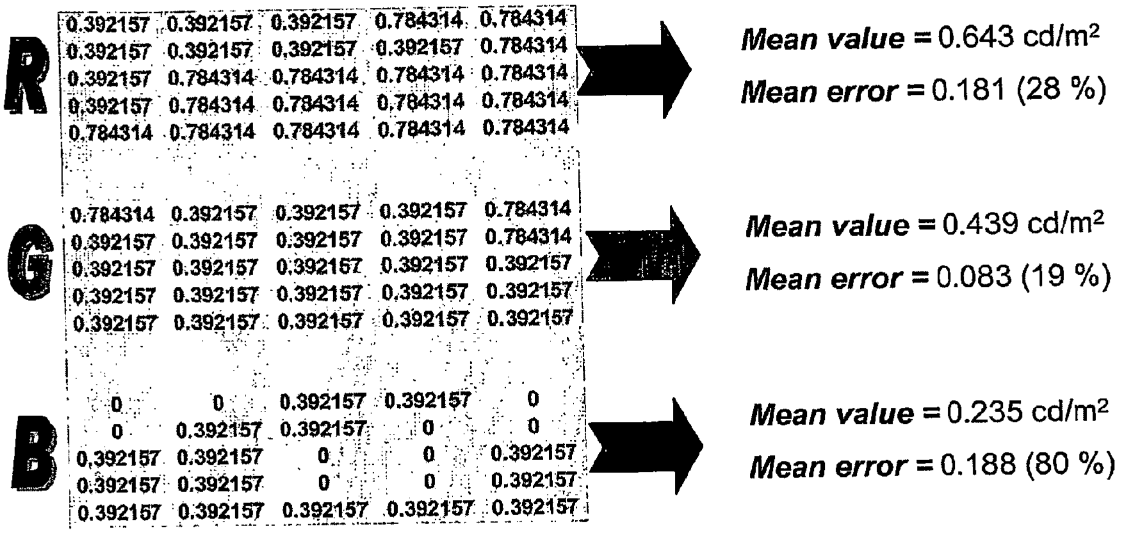

Then, for each digital value, a luminance value can be computed taking the assumption that the plasma is a pure linear system, the value 255 is matched with 100 cd/m$^2$ The visibility of the noise structure can be estimated as shown in FIG. 5 which corresponds to FIG. 3 but in the case of a PDP.

The estimation of the noise structure on a plasma showed that the increased quantization step in the dark areas lead to a strong noise pattern. Therefore the bustling effect of the noise will increase strongly on a plasma screen in comparison to standard displays (the mean error may be up to 80%). This is also enhanced by the fact that the human visual system behavior follows a logarithm law, more sensitive for low-levels than for high levels.

As explained in the previous paragraph, the noise is more visible on a plasma than on other display in the dark areas (e.g. CRTs). Therefore, it is judicious to implement a kind of noise reduction algorithm on PDPs. Actually, various displays already dispose of such algorithms. Nevertheless, standard noise reduction algorithms also have drawbacks like a loss of sharpness, moving artifacts (trail behind strong edges).

INVENTION

In view of that, it is the object of the present invention to provide a method and a device for reducing the noise in an improved manner.

According to the present invention this object is solved by a method for reducing noise caused by a quantization procedure during the signal processing of a digital display device by digitally filtering a signal charged with said noise with a digital filter having a plurality of filter coefficients, and varying at least one of said filter coefficients in dependence on a value of said signal to be filtered.

Furthermore, the above mentioned object is solved by a device for reducing noise caused by a quantisation during the signal processing of a digital display device including digital filter means for digitally filtering a signal charged with said noise, said filter means having a plurality of filter coefficients, and controlling means connected to said digital filter means for varying at least one of said filter coefficients in dependence on a value of said signal to be filtered.

Further favourable developments of the present invention are set out in the subclaims.

Advantageously, there may be provided a noise reduction algorithm which has an effect decreasing with the video level, so that a maximum filtering is applied for low-levels (critical noisy regions) whereas no filtering or very low filtering is applied for luminous regions (less noise, more critical to noise reduction algorithms). Such an adaptive noise filter may be applied after the gammatization process of the plasma. The adaptive filtering is a specific filtering which suits to the gammatization quantization noise. In other words, the filtering will be maximum for dark areas and its efficacy will automatically decrease when the luminance of the area is increasing.

The application of the filtering according to the present invention leads to the following advantages:

The noise on a plasma panel is reduced in its critical regions.

The sharpness of the picture is not reduced or details do not disappear.

Moving artefacts do not appear.

DRAWINGS

Figure 6:
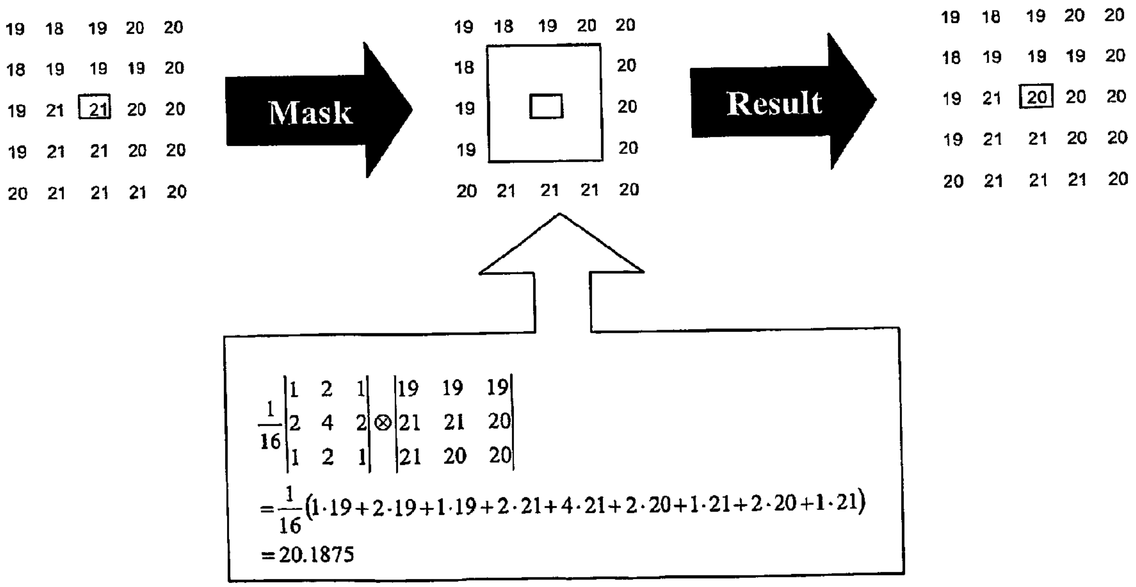
Figure 7:
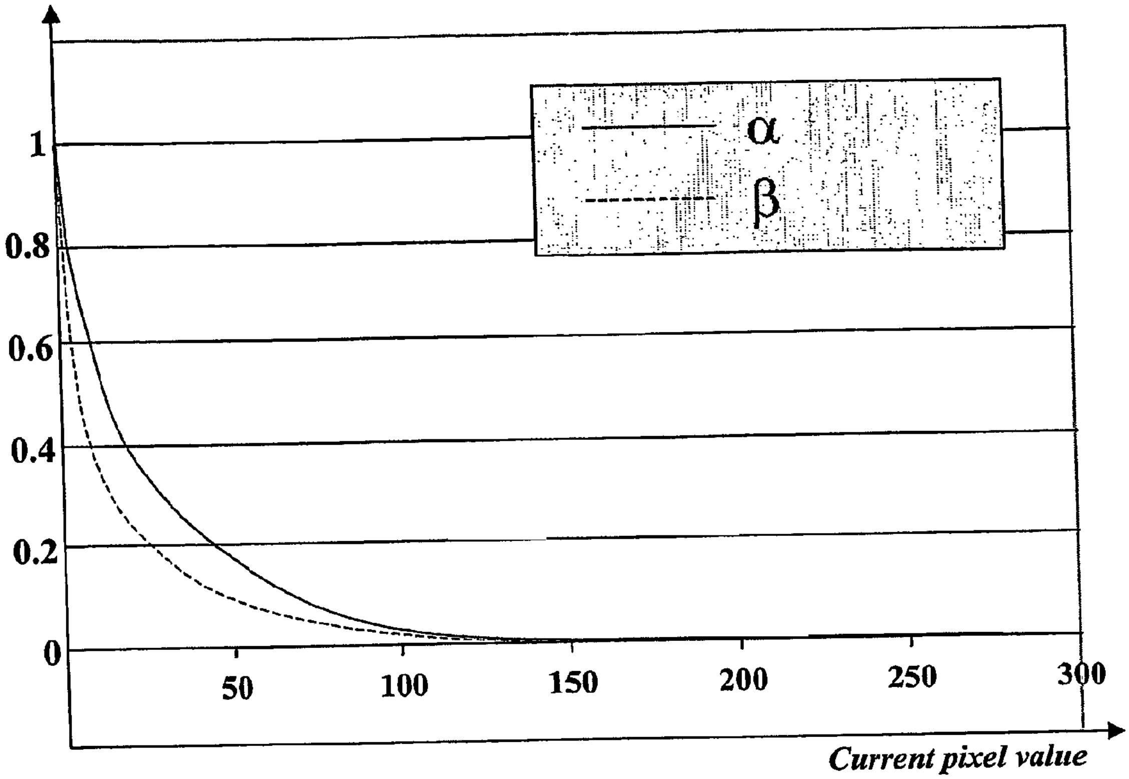
Figure 8:
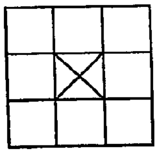
Figure 9:
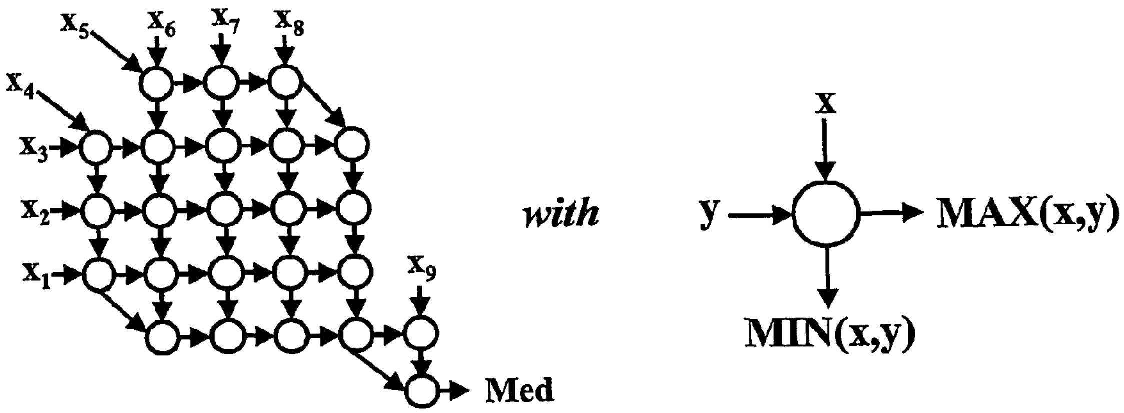
Figure 10:
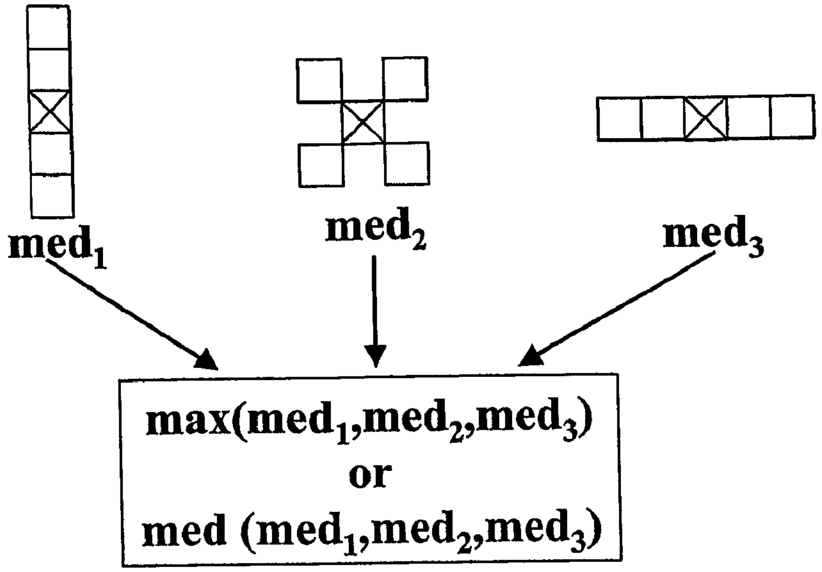
Figure 11:
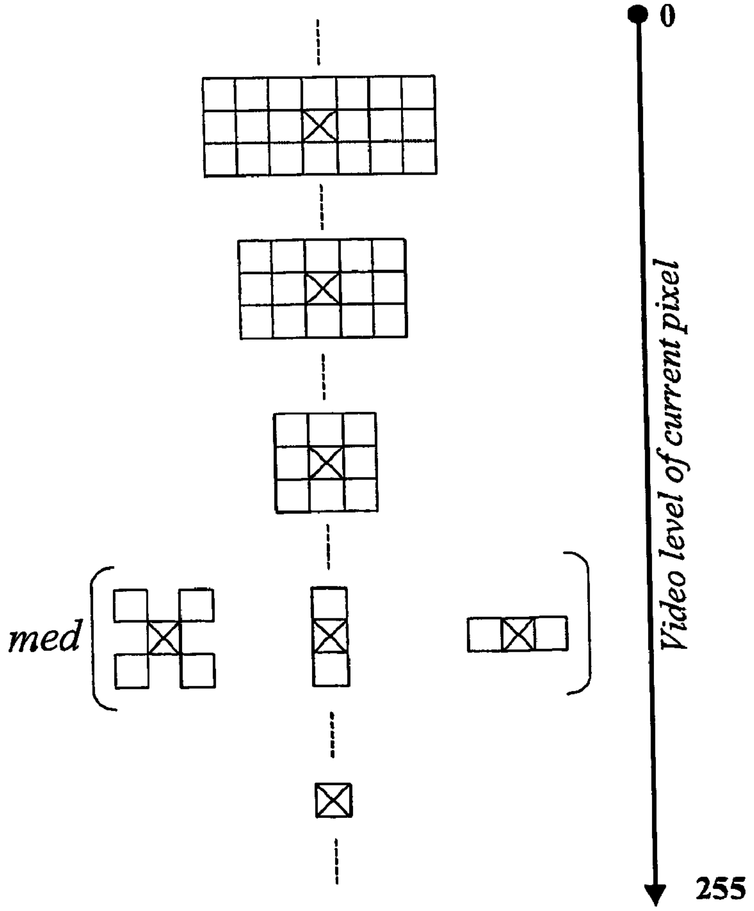

Exemplary embodiments of the invention are illustrated in the drawings and are explained in more detail in the following description. The drawings showing in:

FIG. 1 a standard gamma function to be applied to the video signal;

FIG. 2 an example of quantization noise and natural noise for the three colour-components of a picture;

FIG. 3 the noise pattern on a CRT disposing of an analog gammatization function;

FIG. 4 a gammatization performed at a digital level of 8 bits;

FIG. 5 an estimation of the visibility of the noise structure on a PDP after gammatization;

FIG. 6 a filter mask applied to a current pixel;

FIG. 7 a diagram showing the variation of filter parameters;

FIG. 8 the structure of a two dimensional median filter;

FIG. 9 an implementation of a median filter;

FIG. 10 variations of median filters;

FIG. 11 an implementation of an adaptive median filtering; and

Figure 12:
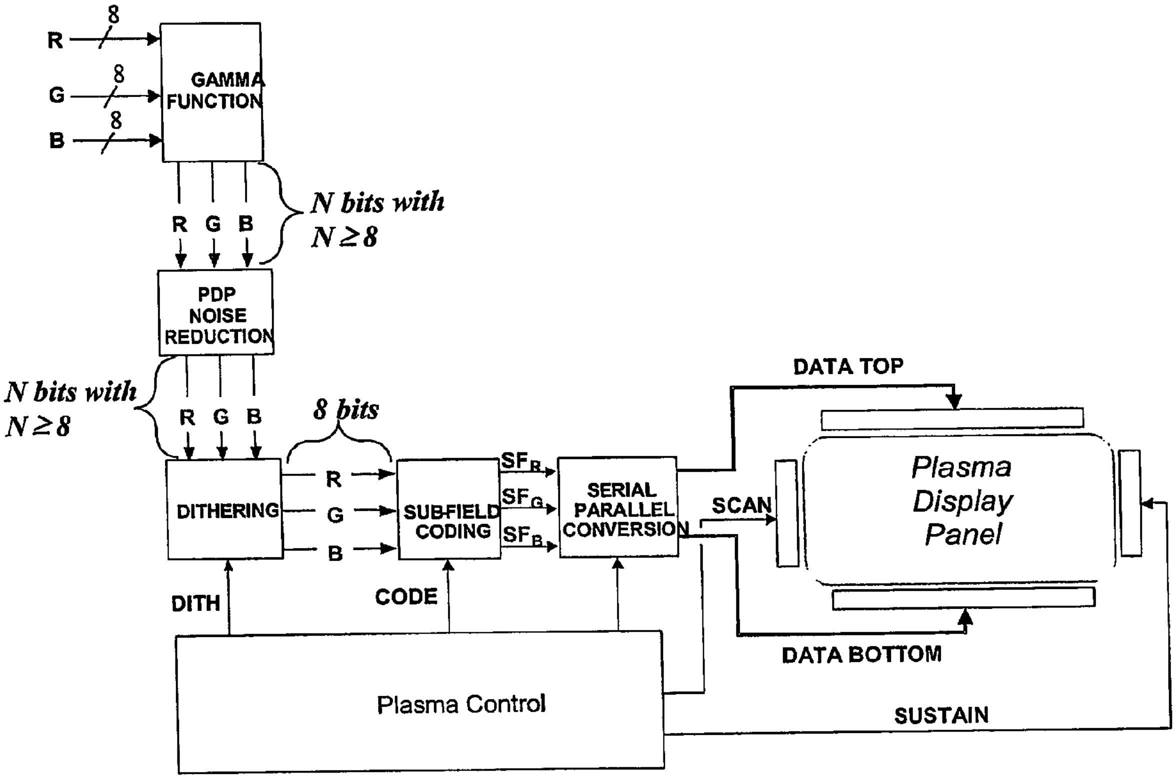

FIG. 12 a hardware implementation of the inventive algorithm.

In order to better understand the present concept two kind of standard noise reduction algorithms are now presented as preferred embodiments.

Low-Pass Filtering

The analysis shall be limited to 2-dimensional low-pass filters based on 3 pixels and three lines. Obviously such filters can be extended in the spatial dimension (more or less pixel, more or less lines) as well as in the temporal direction by applying a kind of recursivity (requires a frame memory). In the following three standard types of low-pass filters (3×3) known in the literature are illustrated:

$$\frac{1}{9}\begin{vmatrix} 1 & 1 & 1 \\ 1 & 1 & 1 \\ 1 & 1 & 1 \end{vmatrix}$$

$$\frac{1}{10}\begin{vmatrix} 1 & 1 & 1 \\ 1 & 2 & 1 \\ 1 & 1 & 1 \end{vmatrix}$$

-continued $$\frac{1}{16}\begin{vmatrix}1 & 2 & 1\\ 2 & 4 & 2\\ 1 & 2 & 1\end{vmatrix}$$

The various masks will be centered to the current pixel as shown in FIG. 6 by the square surrounding the number 21. The calculation of the filtering result is also shown in the figure. More specifically, a mask of 3×3 pixels is applied on the picture centered to the current pixel. Then a convolution product is realised between the values delimited by the mask and the filter as clearly shown on said FIG. 6 giving the resulting values of the right pattern in FIG. 6.

In the case of the plasma one can develop two kinds of video adapted low-pass filtering as presented below:

$$\frac{1}{(8\cdot\alpha+1)}\begin{vmatrix}\alpha & \alpha & \alpha\\ \alpha & 1 & \alpha\\ \alpha & \alpha & \alpha\end{vmatrix}$$

$$\frac{1}{(4\cdot(\alpha+\beta)+1)}\begin{vmatrix}\beta & \alpha & \beta\\ \alpha & 1 & \alpha\\ \beta & \alpha & \beta\end{vmatrix}$$

In these two kinds of PDP filtering the factors α and β will have a value decreasing with the luminance of the current pixel. Two examples of a possible variation of these parameters are shown in FIG. 7.

This low-pass filtering is already well adapted to PDP requirements except for the fact that some disturbances can be generated on sharp transition. The case of a current dark pixel located near to a white element shall be taken as example. In that case, this white element will be used for the low-pass filtering which is not the objective. Therefore, more adaptation should be added to the filtering as described below.

For the future explanation the current pixels in the screen shall be described by $x_0$ and the pixels around using the following definition:

$$\begin{vmatrix}x_2 & x_3 & x_4\\ x_1 & x_0 & x_5\\ x_8 & x_7 & x_6\end{vmatrix}$$

Based on this assumption, a more general adapted low-pass filtering for the PDP will be defined as following:

$$\frac{1}{\sum_{i=0}^{i=8} a_i}\begin{vmatrix}a_2 & a_3 & a_4\\ a_1 & a_0 & a_5\\ a_8 & a_7 & a_6\end{vmatrix}$$

with $a_0=1$ and with $a_i=f_i(x_0, x_i)$

As an example one can describe the function $f_i$ as following:

$$f_{2n}(x_o, x_{2n}) = \begin{vmatrix}\alpha \text{ if } |x_{2n}-x_0| \le \Delta\\ 0\end{vmatrix} \text{ and } f_{2n+1}(x_o, x_{2n+1}) = \begin{vmatrix}\beta \text{ if } |x_{2n+1}-x_0| \le \Delta\\ 0\end{vmatrix} \text{ with } \square$$

representing a limit of neighbour which can be taken into account by the filtering. This solution is well adapted in case of big difference of values between two adjacent pixels.

Median Filtering

At the beginning of the present analysis, the filters have been limited to 2-dimensional low-pass filters based on 3 pixels and three lines. Obviously such filters can be extended in the spatial dimension (more or less pixels, more or less lines) as well as in the temporal direction (requires a frame memory).

The median filter selects, in an analysis window, the pixel having the median value. For that purpose, the analysis window contains an odd number of pixels that will be ordered. Then, the new computed value will be the value having the median position. An example of a median filter 3×3 is shown in FIG. 8. It may be formulated as follows:

$$med\left(\begin{vmatrix}x_2 & x_3 & x_4\\ x_1 & x_0 & x_5\\ x_8 & x_7 & x_6\end{vmatrix}\right) = med(x_0, x_1, x_2, x_3, x_4, x_5, x_6, x_7, x_8)$$

FIG. 9 presents a way to simply implement a median filter based on simple function (comparators) like MIN( ) and MAX( ).

Other median filters can be used like a filter max/median which can be defined as illustrated in FIG. 10. These functions realize a maximum or a median of three medians having various analysis directions.

In any case, it has to be said that a median filter having a size of 2N+1 pixels suppress in the picture all details having a size smaller or equal to N.

Therefore, in the case of the PDP adaptive median filtering, one can use various filters depending on the value of the current pixels. FIG. 11 presents a possible implementation of such an adaptive filtering, the choice of the filters depending on the video level. It represents only an example of an adaptive median filtering implemented after the gammatization process in the PDP.

General Filtering

As already said, the main idea is to use a noise reduction algorithm which has a decreasing effect when the video level of the current pixel is increasing. Moreover, the filtering will be applied after the gammatization process which can be made on more than 8 bits because of further operations like dithering. Obviously, an operation like a dithering should be made after the noise reduction in order not to be deactivated by the noise reduction itself.

Algorithm Implementation:

FIG. 12 illustrates a possible hardware implementation for the algorithm.

RGB input pictures are forwarded to the gamma function block: this can include a LUT or a mathematical function. The outputs of this block (8-bit or more) are forwarded to the noise reduction block. This last block, depending on the current value of a pixel, will apply various noise reduction filters at the same bit resolution. Then, the output is forwarded to the dithering block which applies differents kinds of dithering (e.g. such as described for example, in EP-A-1136974, EP-01250199.5 and EP-02291924.5 in the name of the present Applicant). The further signal processing is performed as usual by a subsequent sub-field coding block, a serial/parallel converter, a parallel acting plasma controller and final PDP.

As already set out above, the main idea is to have a maximum of noise reduction for dark areas where the noise is really disturbing (eye sensitivity stronger, gammatization critical) and where the information in terms of detail is less relevant. On the other hand, the level of the filtering will decrease together with the luminance up to no filtering for high luminance levels where the noise is less disturbing (no effect of quantization, less eye sensitivity) but where the information in terms of details will be the more relevant.

The invention claimed is:

1. Method for reducing quantization error during video level signal processing for a display device with digitally driven pixels, comprising:

digitally filtering a signal charged with said quantization error with a digital filter having a plurality of filter coefficients, said signal including a video level for each pixel of said display device, and varying at least one of said filter coefficients of the filter in dependence on the video level for a current pixel by stronger filtering a lower video level for said pixel while less filtering or not filtering a higher video level for said pixel to reduce quantization error in the lower video level;

wherein said filtering includes one and/or two dimensional median filtering.

2. Method according to claim 1, wherein said filtering includes one and/or two dimensional low pass filtering.

3. Method according to claim 1, wherein a decreased value for the filter coefficient is used for a pixel with increased luminance.

4. Method according to claim 1, wherein the spatial dimension and/or the temporal direction of said digital filter varies with the video level of a current pixel.

5. Method according to claim 1, wherein, in case of a low pass filter, the coefficients are given by $$\frac{1}{\sum_{i=0}^{i=8} a_i}\begin{vmatrix} a_2 & a_3 & a_4 \\ a_1 & a_0 & a_5 \\ a_8 & a_7 & a_6 \end{vmatrix}$$

with $a_0=1$ and with $a_i=f_i(x_0, x_i)$.

6. Method according to claim 5, wherein, the function is the following:

$$f_{2n}(x_o, x_{2n}) = \left| \begin{matrix} \alpha \text{ if } |x_{2n} - x_0| \le \Delta \\ 0 \end{matrix} \right.$$

and $$f_{2n+1}(x_o, x_{2n+1}) = \left| \begin{matrix} \beta \text{ if} |x_{2n+1} - x_0| \le \Delta \\ 0 \end{matrix} \right.$$

with Δ a limit of neighbor.

7. Device for reducing quantization error during video level signal processing for a display device with digitally driven pixels, comprising:

digital filter means for digitally filtering a video signal charged with said quantization error, said filter means having a plurality of filter coefficients, and said signal including a video level for each pixel of said display device, and a controlling means connected to said digital filter means for varying at least one of said filter coefficients in dependence on the video level for a current pixel by stronger filtering a lower video level for said pixel while less filtering or not filtering a higher video level for said pixel to reduce noise in the lower video level;

wherein said digital filter means includes a one and/or two dimensional median filter.

8. Device according to claim 7, wherein said digital filter means includes one and/or two dimensional low pass filter.

9. Device according to claim 7, wherein the value of a filter coefficient is decreasable by said controlling means when the luminance of a current pixel increases.

10. Device according to claim 7, wherein the spatial dimension and/or the temporal direction of a filter of said digital filter means is variable with the video level of a current pixel by said controlling means.

* * * * *